Dec. 15, 1964 W. T. BAGGETT 3,161,334
FISH STRINGER ATTACHMENT
Filed June 4, 1962
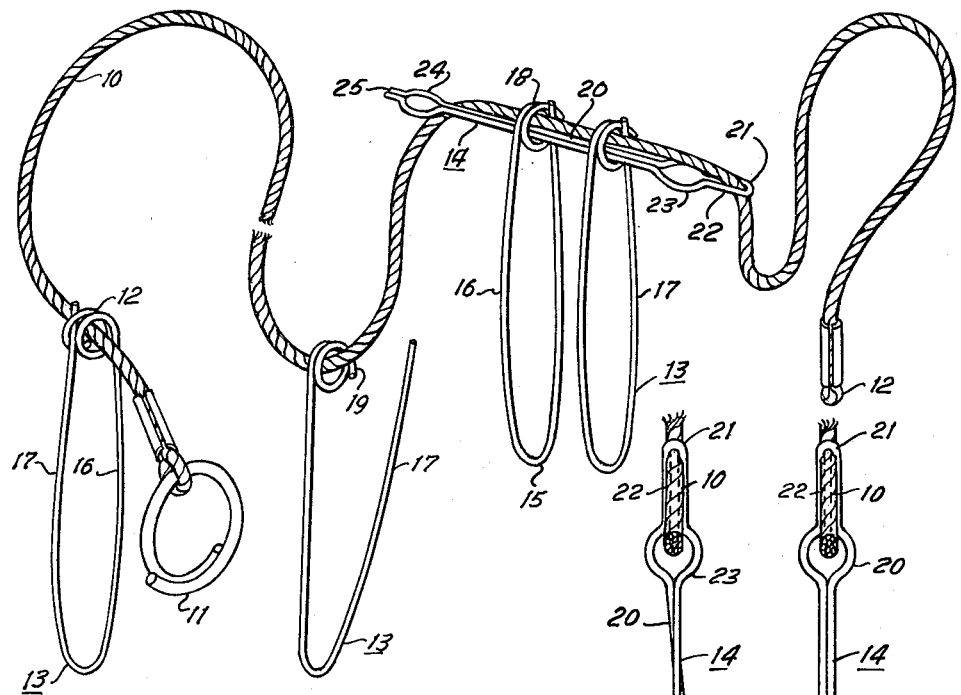
FIG. 1  FIG. 3  FIG. 2
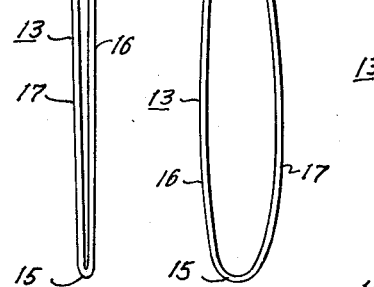
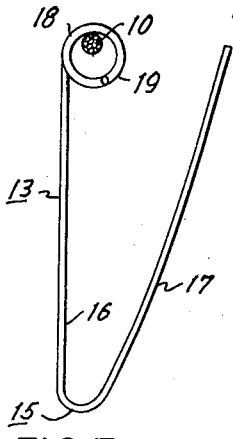
FIG. 5  FIG. 6  FIG. 7  FIG. 4
INVENTOR
William T. Baggett
BY  Ashley & Ashley
ATTORNEYS 3,161,334
FISH STRINGER ATTACHMENT
William T. Baggett, 5934 Abrams Road, Dallas 31, Tex.
Filed June 4, 1962, Ser. No. 199,739
2 Claims. (Cl. 224—7)

This invention relates to new and useful improvements in attachments for fish stringers.

One object of the invention is to provide an improved attachment for a fish stringer which is so constructed that it may be readily mounted on a conventional stringer so as to permit positive connection of fish thereto in such manner that the fish are free to move to a limited extent so as to prolong the lives thereof.

Another object of the invention is to provide an improved fish stringer attachment having a plurality of clips arranged to be threaded on the line of a stringer and on a retainer which is frictionally engaged with the line for confining the clips against displacement and permitting the same to be slipped off thereof for individually stringing fish on the line.

A particular object of the invention is to provide a fish stringer of the type shown in my Patent No. 2,959,333 having clips of improved, simplified structure and an improved retainer for more positively holding the clips against displacement.

A construction designed to carry out the invention will be hereinafter described, together with other features of the invention.

The invention will be more readily understood from a reading of the following specification and by reference to the accompanying drawing, wherein an example of the invention is shown, and wherein:

FIG. 1 is a perspective view of a conventional fish stringer having mounted thereon an attachment constructed in accordance with the invention, FIG. 2 is a plan view of the retainer of the attachment with the line being broken away to show the relationship of the eye of one of the clips, in section, to said retainer, FIG. 3 is a view, similar to FIG. 2, showing the contraction of the retainer for the removal of one of the clips, FIG. 4 is an end view of the retainer, taken at a right angle to FIG. 2, FIG. 5 is a side, elevational view of one of the clips threaded on the line, FIG. 6 is an elevational view, taken at a right angle to FIG. 5, showing the closed clip in plan and the line in section, and FIG. 7 is a view, similar to FIG. 6, showing the clip open.

In the drawing, the numeral 10 designates the cord or line of a conventional fish stringer having a ring 11 suitably fastened to one end and a suitable tip 12 at its opposite end. For stringing a plurality of fish on the line without crowding and unnecessarily shortening the lives thereof, an improved attachment of the type shown in my patent, supra, has been provided.

The attachment includes a plurality of clips or fasteners 13 for individually stringing fish on the line 10 and a coacting holder or retainer 14 for confining the clips against displacement. The clips and retainer are formed of spring wire or other suitable material and are bent to the desired shapes. Each clip 13 includes a substantially V-shaped body or portion 15 having a pair of diverging arms or legs 16 and 17. A circular eye or loop 18 is provided at the free or upper end of the leg 16 and is formed by winding said free end in approximately one and one-half convolutions. As shown by the numeral 19, the convolutions terminate at the bottom or inner portion of the eye in an end portion or hook which extends toward the leg 16 and which is spaced axially or laterally from the remainder of said loop. The hook 19 is adapted to removably confine the upper or free end of the leg 17 which extends above or beyond the eye and which functions as a prong. It is readily apparent that the clips 13 are adapted to be threaded by their eyes 18 on the stringer line for sliding movement and that said clips are closed when their prongs 17 are confined by the hooks 19.

The clip retainer 14 includes a pair of elongated, contiguous legs 20 which are connected at one end by a bight portion 21, of small radius, whereby said retainer is in the form of a relatively-narrow, substantially U-shaped body. It is noted that the length of the legs 20 is subject to variation and that said legs are adapted to extend longitudinally of the line with the bight portion 21 directed toward the tip 12. Due to the small radius of the bight portion, the legs are in close proximity to each other, particularly, the inner end portions 22 of the legs adjacent said bight portion which are adapted to frictionally engage or clamp the line therebetween (FIGS. 1–3). Adjacent its ends, each leg is bowed or curved outward laterally to provide substantially circular enlargements or protuberances 23 and 24 for confining the eyes 18 of the clips 13 therebetween. The eyes of the clips are adapted to be threaded over the extremities 25 of the legs 20 and the adjacent enlargement 24. Therefore, the clips may be threaded on the line before attachment of the retainer to said line in order to facilitate manual slipping of the eyes of said clips over the enlargement 24 onto said retainer. As shown in FIG. 3, the legs of the retainer are adapted to be contracted so that the outer portions thereof, particularly, their extremities 25, overlap and reduce the size of the enlargement 24. When released, the legs 20 spring outwardly so as to dispose their extremities in abutting, side-by-side relationship (FIG. 2). Also the intermediate portions of the legs may engage each other as well as extend in parallel alinement.

It is believed to be obvious that a plurality of clips 13 may be confined against displacement upon the legs 20 of the retainer 14 between the enlargements 23 and 24 and may be readily slipped from said retainer over said enlargements whenever it is desired to string a fish. The prong 17 permits piercing of the lower jaw of the fish so that it will live longer and remain fresh and lively by being permitted to swim about with its mouth closed. The retainer may be quickly attached to and removed from the line and may be utilized to receive additional clips which may be threaded inwardly over the enlargement 23 or outwardly over the enlargement 24. It is contemplated that the size of the clips and retainer, as well as the diameter of the wire, may be varied for large or small fish.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In combination with a fish stringer having a line with a ring at one end and a tip at its opposite end, an attachment including a substantially U-shaped retainer body having contiguous parallel legs extending longitudinally of and frictionally engaging the line, each leg being offset outward laterally adjacent each end to provide enlargements spaced from the ends of the legs, and a plurality of fasteners having loop means threaded on the line for sliding movement thereon and adapted to be removably confined on the retainer body between the enlargements of its legs by being slipped over one of said enlargements, each fastener having prong means for individually stringing a fish and its loop means having an internal diameter slightly less than the width of said enlargements to permit forcing of said loop means over either of said enlargements.

2. A fish stringer attachment as set forth in claim 1 wherein the portions of the legs of the retainer body between the enlargements and the free ends of said legs are in engagement whereby said body is relatively narrow between its enlargements and at its ends and the fasteners are confined on said body solely by the enlargements.

References Cited in the file of this patent
UNITED STATES PATENTS

| | | |
|---|---|---|
| 1,590,172 | Thorberg | June 22, 1926 |
| 1,521,113 | MacKey | Dec. 30, 1924 |
| 2,959,333 | Baggett | Nov. 8, 1960 |